United States Patent
Ichihara et al.

(10) Patent No.: US 8,792,001 B2
(45) Date of Patent: Jul. 29, 2014

(54) INFORMATION PROCESSING APPARATUS, INFORMATION PROCESSING METHOD, AND COMPUTER PROGRAM

(75) Inventors: Masayuki Ichihara, Tokyo (JP); Masanao Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1358 days.

(21) Appl. No.: 12/205,980

(22) Filed: Sep. 8, 2008

(65) Prior Publication Data

US 2009/0091616 A1  Apr. 9, 2009

(30) Foreign Application Priority Data

Oct. 5, 2007 (JP) ................. 2007-261876

(51) Int. Cl.
*H04N 7/18* (2006.01)

(52) U.S. Cl.
USPC .......................................................... 348/143

(58) Field of Classification Search
CPC ............... G11B 27/034; G11B 27/323; H04N 1/32101; H04N 15/76; H04N 15/772
USPC .......................................................... 348/143
See application file for complete search history.

(56) References Cited

U.S. PATENT DOCUMENTS

| 7,120,313 B2* | 10/2006 | Kotake et al. ............... 382/282 |
| 7,746,388 B2* | 6/2010 | Jeon ............................ 348/231.2 |
| 2001/0015759 A1* | 8/2001 | Squibbs ....................... 348/232 |
| 2003/0189636 A1* | 10/2003 | Ejima et al. ................ 348/14.01 |

FOREIGN PATENT DOCUMENTS

| JP | 5-300463 | 11/1993 |
| JP | 2000-187687 | 7/2000 |
| JP | 2001-282813 | 10/2001 |
| JP | 2002-125345 | 4/2002 |
| JP | 2007-20054 | 1/2007 |
| WO | WO 2007/043572 A1 | 4/2007 |

* cited by examiner

*Primary Examiner* — David X Yi
(74) *Attorney, Agent, or Firm* — Oblon, Spivak, McClelland, Maier & Neustadt, L.L.P.

(57) ABSTRACT

An information processing apparatus is provided, in which content and position information generated independently of each other are recorded in a recording medium. The apparatus includes a recording medium in which the content and the position information are recorded and a deletion unit deleting position information temporally associated with a piece of the content from the recording medium when the piece of content is deleted from the recording medium.

13 Claims, 8 Drawing Sheets

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2007-261876 filed in the Japanese Patent Office on Oct. 5, 2007, the entire content of which being incorporated herein by reference.

BACKGROUND OF THE INVENTION

1. Field of the Invention

The present invention relates to an information processing apparatus, an information processing method, and a computer program. More, particularly, the invention relates to am information processing apparatus recording content and position information independently of each other and an information processing method and a computer program for processing content and position information recorded independently of each other.

2. Description of the Related Art

Some information processing apparatus acquire still images and moving images (which will be collectively referred to as "content") by imaging an object, acquire position information when imaging the object, and record the position information in a recording medium (see JP-A-2000-187687 (Patent Document 1)). For example, some video cameras have a GPS (Global Positioning System) incorporated therein to measure the position of the video cameras during an imaging operation or when the cameras are supplied with power. Position information obtained as a result of the measurement is recorded in a time-sequential manner in a semi-conductor memory or hard disk which is also incorporated.

SUMMARY OF THE INVENTION

Although content can be deleted from such an information processing apparatus, position information can not be deleted. The reason is that content and position information are not associated with each other. Thus, position information remains in a recording medium even after content is deleted, which has resulted in the problem of wasteful use of the capacity of a recording medium.

Thus, it is desirable to provide a novel and improved information processing apparatus, information processing method, and computer program which allow position information temporally associated with a piece of content to be automatically deleted when the content is deleted to save the capacity of a recording medium.

According to an embodiment of the invention, there is provided an information processing apparatus in which content and position information generated independently of each other are recorded in a recording medium, characterized in that it includes a recording medium in which content and position information are recorded and a deletion unit deleting position information temporally associated with a piece of content from the recording medium when the piece of content is deleted from the recording medium.

In such a configuration, content and position information are recorded in a recording medium. When a piece of content is deleted from the recording medium, the deletion unit deletes position information temporally associated with the piece of content from the recording medium. Thus, when a piece of content is deleted, position information temporally associated with the piece of content is automatically deleted to save the capacity of the recording medium.

When content generated on a specified day is entirely deleted, the deletion unit may delete all position information generated on that day from the recording medium. In such a configuration, when content generated on a specified day is entirely deleted, the deletion unit deletes position information generated on that day from the recording medium. Thus, the capacity of the recording medium can be saved by automatically deleting the position information associated with the date when the content was generated.

When content is entirely deleted, the deletion unit may delete all position information from the recording medium. In such a configuration, when content is entirely deleted, the deletion unit deletes all position information from the recording medium. Thus, the capacity of the recording medium can be saved by automatically deleting all position information.

The information processing apparatus may further include a position information acquisition unit acquiring information for generating position information. In such a configuration, the position information acquisition unit acquires information for generating position information and records the information in a recording medium. Thus, when a piece of content is deleted, position information temporally associated with the piece of content generated from information acquired by the position information acquisition unit is automatically deleted, which allows the capacity of the recording medium to be saved.

The information processing apparatus may further include an imaging unit generating content by imaging an object. In such a configuration, the imaging unit generates content by imaging an object. Thus, when a piece of content generated by the imaging unit is deleted, position information temporally associated with the piece of content can be automatically deleted to save the capacity of the recording medium.

According to another embodiment of the invention, there is provided an information processing method for processing content and position information generated independently of each other and recorded in a recording medium, characterized in that it includes the step of deleting position information temporally associated with a piece of content from a recording medium when the piece of content is deleted from the recording medium.

In such an embodiment, content and position information is recorded in a recording medium, and position information temporally associated with a piece of content is deleted from the recording medium is deleted when the piece of content is deleted from the recording medium. Thus, the capacity of the recording medium can be saved by automatically deleting the position information temporally associated with the piece of content when the content is deleted.

According to another embodiment of the invention, there is provided a computer program processing content and position information generated independently of each other and recorded in a recording medium, characterized in that it includes the step of deleting position information temporally associated with a piece of content from the recording medium when the piece of content is deleted from the recording medium.

In such a configuration, content and position information is recorded in a recording medium, and position information temporally associated with a piece of content is deleted from the recording medium at the deleting step when the piece of content is deleted from the recording medium. Thus, the capacity of the recording medium can be saved by automatically deleting the position information temporally associated with the piece of content when the piece of content is deleted.

As described above, according to the embodiments of the invention, there is provided a novel and improved information processing apparatus, information processing method, and computer program which allow the capacity of a recording medium to be saved by automatically deleting position information temporally associated with a piece of content when the content is deleted.

DETAILED DESCRIPTION OF THE INVENTION

Figure 1:
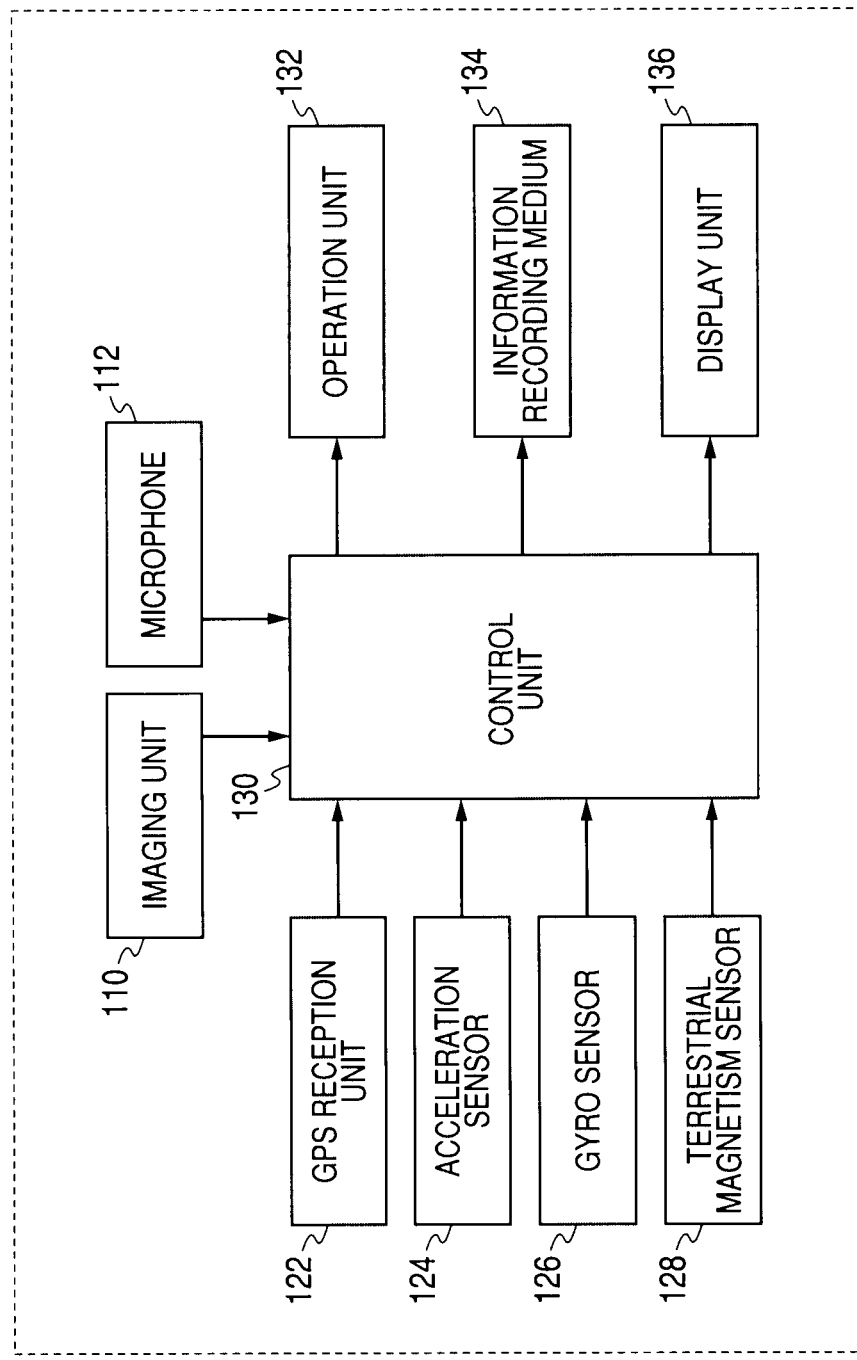
FIG. 1 is an illustration for explaining an information processing apparatus according to a first embodiment of the invention.

Embodiments of the invention will now be described in detail with reference to the accompanying drawings. In the specification and drawings, elements having substantially the same function and configuration are indicated by the same reference numeral to avoid duplicated description.

First Embodiment

An information processing apparatus according to a first embodiment of the invention will be first described. FIG. 1 is an illustration for explaining an information processing apparatus 100 according to a first embodiment of the invention. The information processing apparatus 100 according to the first embodiment of the invention will now be described with reference to FIG. 1.

The information processing apparatus 100 is an apparatus which acquires still images or moving images (such images may be hereinafter collectively referred to as "content") by imaging objects. The information processing apparatus 100 also acquires information on the position of itself. Hereinafter, content obtained by imaging an object may be referred to as "imaged content". As shown in FIG. 1, the information processing apparatus 100 according to the first embodiment of the invention includes an imaging unit 110, a microphone 112, a GPS reception unit 122, an acceleration sensor 124, a gyro sensor 126, a terrestrial magnetism sensor 128, a control unit 130, an operation unit 132, an information recording medium 134, and a display unit 136.

The imaging unit 110 images an object and converts image light from the object into an electrical signal. Although not shown, the imaging unit 110 includes a zoom lens, a diaphragm, a focus lens, and an imaging device such as a CCD (charge coupled device) or CMOS (complementary metal oxide semiconductor) device. The microphone 112 collects sounds around the information processing apparatus 100 and converts the collected sounds into an electrical signal. The electrical signals obtained by the imaging unit 110 and the microphone 112 are sent to the control unit 130.

The GPS reception unit 122 receives a GPS signal from a GPS satellite. Based on the received GPS signal, the GPS reception unit 122 calculates the current position of the information processing apparatus 100. The current position of the information processing apparatus 100 calculated by the GPS reception unit 122 is sent to the control unit 130.

The acceleration sensor 124 measures acceleration of the information processing apparatus 100. The acceleration sensor 124 used in the present embodiment may be a MEMS (micro electro mechanical system) sensor. The MEMS sensor has an acceleration detecting mechanism fabricated using semiconductor processes. The acceleration of the information processing apparatus 100 measured by the acceleration sensor is sent to the control unit 130.

The gyro sensor 126 measures an angular velocity of the information processing apparatus 100. Like the acceleration sensor 124, the gyro sensor 126 used in the present embodiment may be a MEMS sensor. The MEMS sensor has an angular velocity detecting mechanism fabricated using semiconductor processes. The angular velocity of the information processing apparatus 100 measured by the gyro sensor 126 is sent to the control unit 130.

The terrestrial magnetism sensor 128 detects a direction of terrestrial magnetism to calculate the orientation of the information processing apparatus 100. The orientation of the information processing apparatus 100 calculated by the terrestrial magnetism sensor 128 is sent to the control unit 130.

The control unit 10 receives information from various parts of the information processing apparatus 100 and performs calculation processes using the information thus received. Although not shown, the control unit 130 may include a CPU (central processing unit) and a memory for temporarily storing data to be used for the calculation processes. The control unit 130 generates image data and audio data using electrical signals from the imaging unit 110 and the microphone 112. The control unit 130 also generates information on the position of the information processing apparatus 100 using the current position of the information processing apparatus 100 supplied from the GPS reception unit 122, the acceleration of the information processing apparatus 100 supplied from the acceleration sensor 124, the angular velocity of the information processing apparatus 100 supplied from the gyro sensor 126, and the orientation of the information processing apparatus 100 supplied from the terrestrial magnetism sensor 128.

The control unit 130 is an example of a deletion unit according to the embodiment of the invention. When a piece of imaged content recorded in the information recording medium 134 is deleted, the control unit deletes information on the position of the information processing apparatus 100 temporally associated with the deleted piece of imaged content from the information recording medium 134.

Information on the position of the information processing apparatus 100 is generated at predetermined time intervals.

The predetermined time intervals may be fixed values, and they may alternatively be set by a user.

The operation unit 132 is provided to allow a user to operate the information processing apparatus 100. Although not shown in FIG. 1, the operation unit 132 includes a power button for turning the power supply of the information processing apparatus 100 on, a shutter button for imaging an object and recording sounds, a cross key for selecting an image to be displayed on the display unit 136, and a button for deleting imaged content recorded in the information recording medium 134.

The information recording medium 134 is provided to record image data, audio data, and information on the position of the information processing apparatus 100. An HDD (hard disk drive), a DVD, a semiconductor memory such as a flash memory, or a tape may be used as the information recording medium 134.

In the information processing apparatus 100 according to the first embodiment of the invention, image data and audio data are generated using electrical signal input from the imaging unit 110 and the microphone 112 independently of information on the position of the information processing apparatus 100 generated using the current position of the information processing apparatus 100 supplied from the GPS reception unit 122, the acceleration of the information processing apparatus 100 supplied from the acceleration sensor 124, the angular velocity of the information processing apparatus 100 supplied from the gyro sensor 126, and the orientation of the information processing apparatus 100 supplied from the terrestrial magnetism sensor 128. The image and audio data and the position information thus generated are recorded independently of each other in the information recording medium 134.

The display unit 136 displays image data imaged by the imaging unit 110 and various types of information on the information processing apparatus 100. An LCD (liquid crystal display) may be used as the display unit 136.

A configuration of the information processing apparatus 100 according to the first embodiment of the invention has been described above. A description will now be made on a method of processing information using the information processing apparatus 100 according to the first embodiment of the invention.

As described above, in the information processing apparatus 100 according to the first embodiment of the invention, image data and audio data are generated independently of information on the position of the information processing apparatus 100. The image and audio data and information on the position of the information processing apparatus 100 generated independently are recorded in the information recording medium 134 independently of each other.

Therefore, according to the related art, even when the operation unit 132 is operated to erase a piece of image data or audio data from the information recording medium 134, information on the position of the information processing apparatus 100 temporally associated with the piece of image data or audio data is not deleted from the information recording medium 134. Since the position information remains instead of being deleted, the capacity of the information recording medium 134 is wastefully used.

Under the circumstance, in the present embodiment of the invention, when a piece of image data or audio data is erased from the information recording medium 134, information on the position of the information processing apparatus 100 temporally associated with the deleted data is deleted from the information recording medium 134. Thus, wasteful use of the capacity of the information recording medium 134 is avoided to use the information recording medium 134 effectively.

Figure 2:
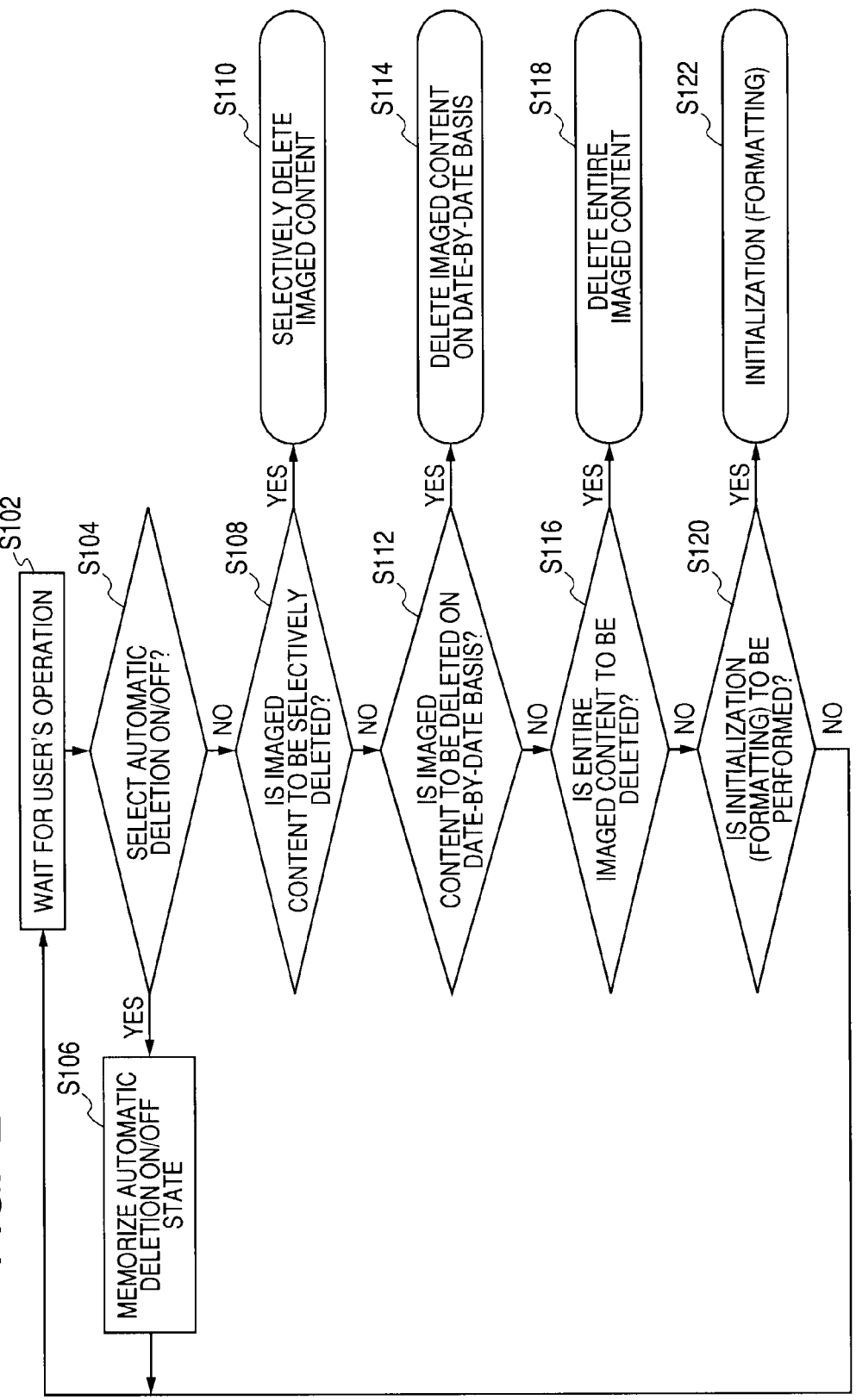
FIG. 2 is a flow chart for explaining a method of processing information using the information processing apparatus according to the first embodiment of the invention.

FIG. 2 is a flow chart explaining the method of processing information using the information processing apparatus 100 according to the first embodiment of the invention. The method of processing information using the information processing apparatus 100 according to the first embodiment of the invention will now be described with reference to FIG. 2.

First, the information processing apparatus 100 waits for an operation of a user of the information processing apparatus 100 (step S102). The user operates the operation unit 132 to perform operations such as imaging an object, making settings of the information processing apparatus 100, and manipulating data recorded in the information recording medium 134.

The information processing apparatus 100 subsequently determines whether the user has made selection on whether to turn on or off automatic deletion (step S104). In the present embodiment, the setting of automatic deletion is an operation of making a setting on whether to automatically delete information on the position of the information processing apparatus 100 temporally associated with a piece of image data or audio data when the data is erased from the information recording medium 134. When a piece of image data or audio data is deleted from the information recording medium 134 with the automatic deletion on, information on the position of the information processing apparatus 100 temporally associated with the deleted data is automatically deleted. When automatic deletion is disabled, even if the image data or audio data is deleted from the information recording medium 134, the information on the position of the information processing apparatus 100 temporally associated with the deleted data is not automatically deleted.

When it is determined at step S104 that the user has selected an automatic deletion on- or off-state, the information processing apparatus 100 memorizes the automatic deletion on- or off-state set by the user (step S106). When the process of memorizing the automatic deletion on- or off-state is completed, the apparatus returns to step S102 to wait until an operation of the user is accepted. When it is determined at step S104 that the user has not selected the automatic deletion on- or off-state, the apparatus determines whether an instruction for selective deletion of imaged content has been received from the user or not (step S108).

When it is determined at step S108 that the user has made an instruction for a process of selectively deleting imaged content, the apparatus proceeds to the process of selectively deleting imaged content (step S110). The process of selectively deleting imaged content will be detailed later. When it is determined at step S108 that the user has made no instruction for the process of selectively deleting imaged content, it is determined whether the user has made an instruction for a process of deleting imaged content on a date-by-date basis (step S112).

When it is determined at step S112 that the user has made an instruction for a process of deleting imaged content on a date-by-date basis, the apparatus proceeds to the process of deleting imaged content on a date-by-date basis (step S114). The process of deleting imaged content on a date-by-date basis will be detailed later. When it is determined at step S112 that the user has made no instruction for the process of deleting imaged content on a date-by-date basis, it is determined whether the user has made an instruction for a process of deleting entire imaged content (step S116).

When it is determined at step S116 that the user has made an instruction for a process of deleting entire imaged content, the apparatus proceeds to the process of deleting entire imaged content (step S118). The process of deleting entire imaged content will be detailed later. When it is determined at step S116 that the user has made no instruction for the process of deleting entire imaged content, it is determined whether the user has made an instruction for a process of initializing (formatting) the information recording medium 134 (step S120).

When it is determined at step S120 that the user has made an instruction for a process of initializing (formatting) the information recording medium 134, the apparatus proceeds to the process of initializing (formatting) the information recording medium 134 (step S122). The process of initializing (formatting) the information recording medium 134 will be detailed later. When it is determined at step S120 that the user has made no instruction for the process of initializing (formatting) the information recording medium 134, the apparatus returns to step S102 to wait until an operation of the user is accepted.

A method of processing information using the information processing apparatus 100 according to the first embodiment of the invention has been described above. Obviously, the order of the steps involved in the information processing method according to the embodiment of the invention is not limited to the example described above. According to the information processing method shown in FIG. 2, whether the user has made instructions for the selective deletion, date-by-date deletion, and overall deletion of imaged content is determined in the order in which the deleting operations are listed. However, the information processing method according to the embodiment of the invention is not limited to such an order of determination.

A description will now be made on the process of selectively deleting imaged content involved in the method of processing information using the information processing apparatus 100 according to the first embodiment of the invention.

Figure 3:
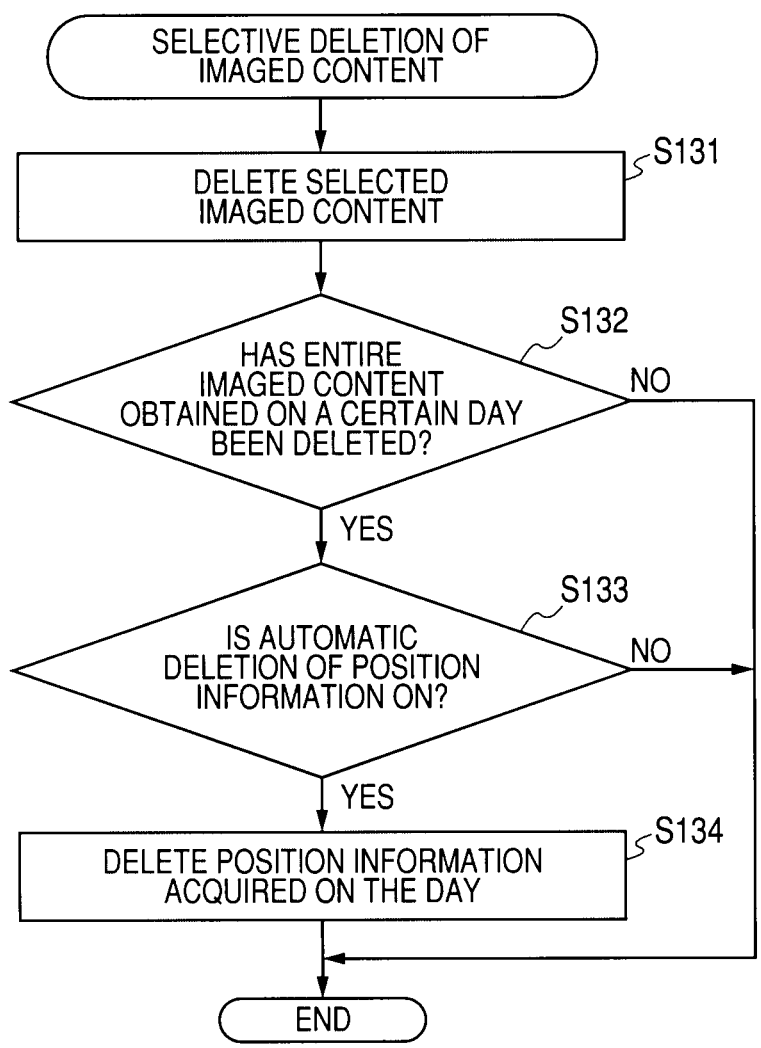
FIG. 3 is a flow chart for explaining a process of selectively deleting imaged content according to the first embodiment of the invention.

FIG. 3 is a flow chart for explaining the process of selectively deleting imaged content according to the first embodiment of the invention. The process of selectively deleting imaged content according to the first embodiment of the invention will now be described with reference to FIG. 3. When the apparatus proceeds to the process of selectively deleting imaged content at step S110 shown in FIG. 2, the control unit 130 deletes pieces of imaged content selected by the user from the information recording medium 134 (step S131). When the content has been deleted from the information recording medium 134, the control unit 130 determines whether all pieces of imaged content imaged on a certain day have been deleted from the information recording medium 134 (step S132).

When the determination at step S132 indicates that all pieces of imaged content imaged on a certain day have been deleted from the information recording medium 134, it is determined whether automatic deletion of position information is enabled (step S133). When the determination at step S133 indicates that automatic deletion of position information is enabled, the control unit 130 deletes all pieces of information on the position of the information processing apparatus 100 acquired on the day from the information recording medium 134 (step S134). Thus, the process of selectively deleting imaged content is terminated.

When the determination at step S132 indicates that all pieces of imaged content imaged on the day have not been deleted from the information recording medium 134 or when the determination at step S133 indicates that automatic deletion of position information is disabled, the process of selectively deleting imaged content is terminated without deleting information on the position of the information processing apparatus 100.

Figure 4:
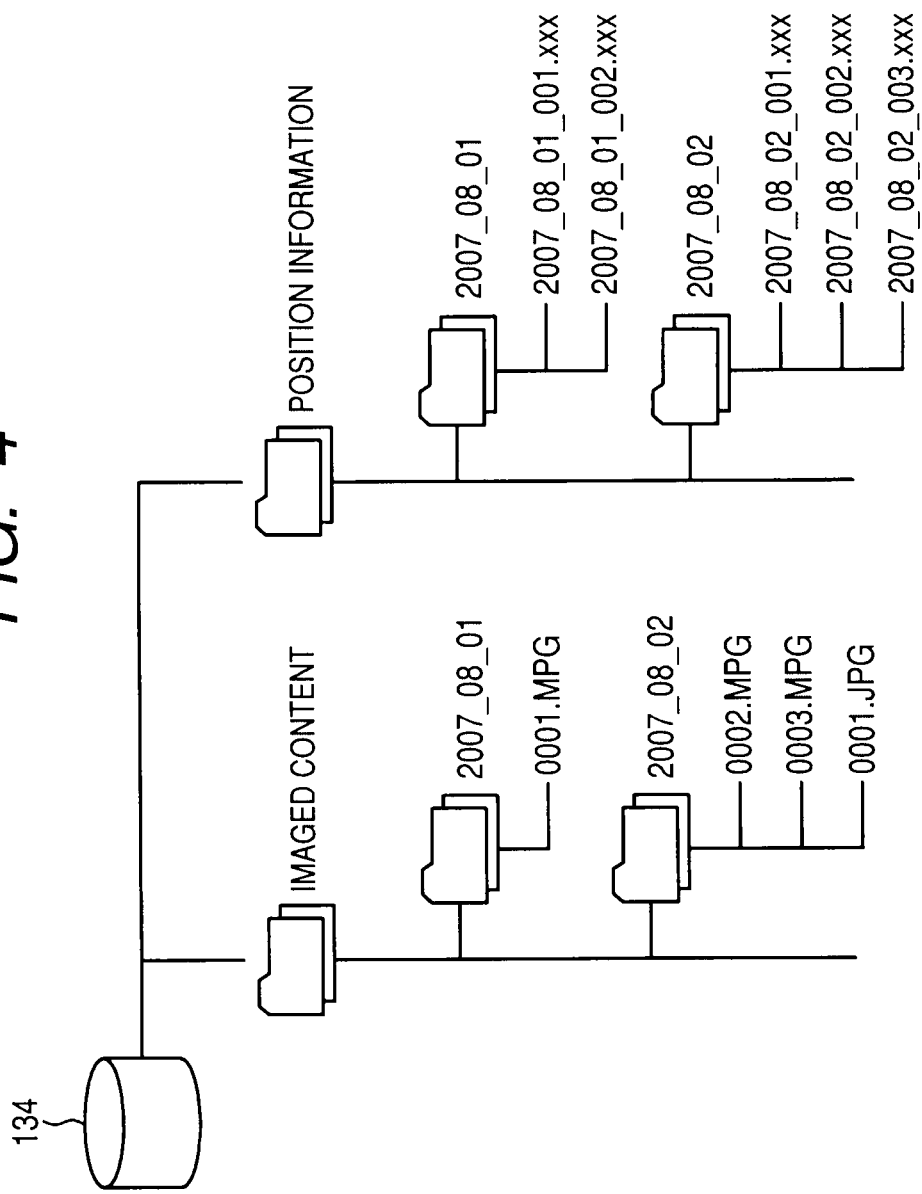
FIG. 4 is an illustration for explaining a recording layout of imaged content and position information recorded in an information recording medium.

FIG. 4 is an illustration for explaining a recording layout for imaged content and position information recorded in the information recording medium 134 of the information processing apparatus 100 according to the first embodiment of the invention. As shown in FIG. 4, imaged content and position information are recorded independently of each other in the information recording medium 134. Both of the imaged content and position information are stored on a date-by-date basis by creating dated folders.

In the example shown in FIG. 4, pieces of imaged content and position information obtained on Aug. 1, 2007 are stored in respective folders named "2007_08_01". Similarly, pieces of imaged content and position information obtained on Aug. 2, 2007 are stored in respective folders named "2007_08_02".

A file having a file name "0001.MPG" which is a moving image file is recorded in the imaged content folder "2007_08_01". Files having file names "0002.MPG" and "003.MPG" which are moving image files and a file having a file name "0001.JPG" which is a still image file are recorded in the imaged content folder "2007_08_02".

Files having file names "2007_08_01_001.xxx" and "2007_08_01_002.xxx" which are position information files are recorded in the position information folder "2007_08_01".

Files having file names "2007_08_02_001.xxx", "2007_08_02_002.xxx", and "2007_08_02_003.xxx" which are position information files are recorded in the position information folder "2007_08_02".

In this case, when the file "0001.MPG" is deleted at step S131, imaged content imaged on Aug. 1, 2007 is entirely deleted from the information recording medium 134. Therefore, it is determined at step S132 that the imaged content imaged on Aug. 1, 2007 has been entirely deleted. When automatic deletion of position information is enabled, the position information files "2007_08_01_001.xxx" and "2007_08_01_002.xxx" recorded in the position information folder "2007_08_01" are deleted at step S134.

On the contrary, when the file "0002.MPG" is deleted at step S131, some of imaged content imaged on Aug. 2, 2007 still remains in the information recording medium 134. It is therefore determined at step S132 that some of imaged content imaged on Aug. 2, 2007 still remains, and the process of selectively deleting imaged content is terminated without deleting information on the position of the information processing apparatus 100.

As thus descried, when imaged content imaged on a certain day is entirely deleted as a result of selective deletion of a piece of imaged content, information on the position of the information processing apparatus 100 acquired on the day is entirely deleted. Thus, wasteful use of the capacity of the information recording medium 134 can be avoided to use the information recording medium 134 effectively.

The process of selectively deleting imaged content according to the first embodiment of the invention has been described above. A description will now be made on the process of deleting imaged content on a date-by-date basis according to the first embodiment of the invention.

Figure 5:
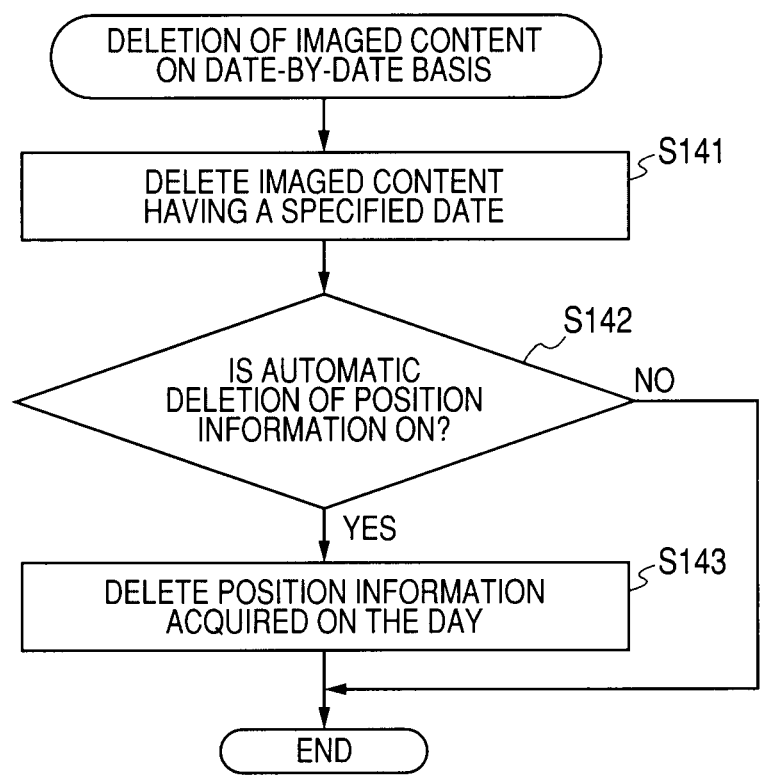
FIG. 5 is a flow chart for explaining a process of deleting imaged content on a date-by-date basis according to the first embodiment of the invention.

FIG. 5 is a flow chart for explaining the process of deleting imaged content on a date-by-date basis according to the first embodiment of the invention. The process of deleting imaged content on a date-by-date basis according to the first embodiment of the invention will be described below with reference to FIG. 5.

When the apparatus proceeds to the process of deleting imaged content on a date-by-date basis at step S114 shown in FIG. 2, the control unit 130 deletes entire imaged content imaged on a day specified by the user from the information recording medium 134 (step S141). When the content has been deleted from the information recording medium 134, the control unit 130 determines whether automatic deletion of position information is enabled (step S142).

When it is determined at step S142 that automatic deletion of position information is enabled, the control unit 130 deletes information on the position of the information processing apparatus 100 acquired on the day entirely (step S143), and the process of deleting imaged content on a date-by-date basis is terminated.

When it is determined at step S142 that automatic deletion of position information is disabled, the process of deleting imaged content on a date-by-date basis is terminated without deleting information on the position of the information processing apparatus 100.

When the user instructs deletion of imaged content imaged on Aug. 2, 2007 from the recording layout shown in FIG. 4, the control unit 130 deletes the three pieces of imaged content stored in the folder "2007_08_02" from the information recording medium 134 (in other words, the folder "2007_08_02" having the imaged content stored therein is deleted).

When automatic deletion of position information is enabled, the control unit 130 deletes the three position information files stored in the folder "2007_08_02" from the information recording medium 134 (in other words, the folder "2007_08_02" having the position information stored therein is deleted).

When imaged content imaged on a certain day is entirely deleted from the information recording medium 134 by specifying the date as thus described, information on the position of the information processing apparatus 100 acquired on the day is entirely deleted. Thus, wasteful use of the information recording medium 134 can be avoided to use the information recording medium 134 effectively.

The process of deleting imaged content on a date-by-date basis according to the first embodiment of the invention has been described above. The process of deleting entire imaged content according to the first embodiment of the invention will now be described.

Figure 6:
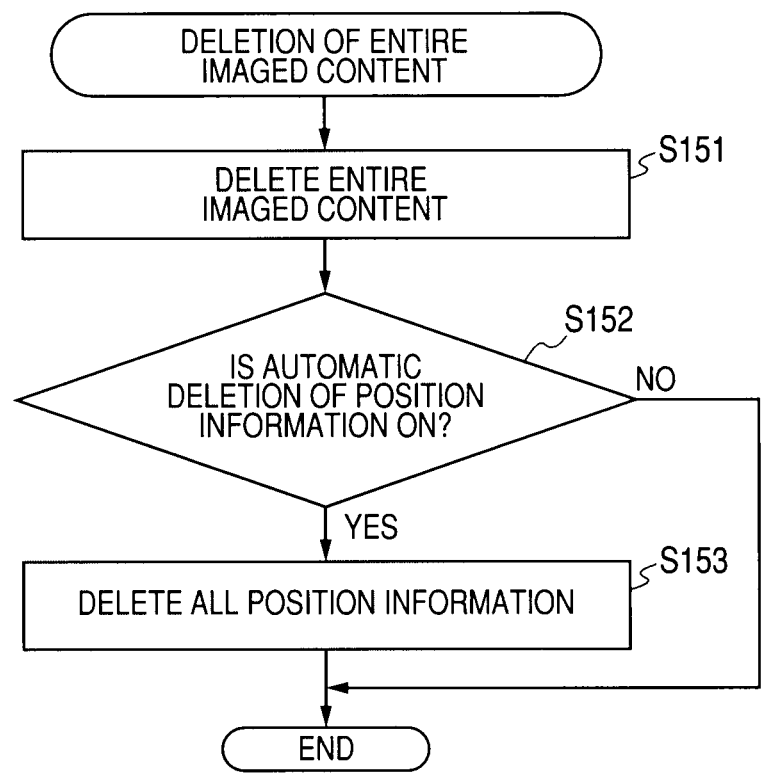
FIG. 6 is a flowchart for explaining a process of deleting entire imaged content according to the first embodiment of the invention.

FIG. 6 is a flow chart for explaining the process of deleting entire imaged content according to the first embodiment of the invention. The process of deleting entire imaged content according to the first embodiment of the invention will be described below with reference to FIG. 6.

When the apparatus proceeds to the process of deleting entire imaged content at step S118 shown in FIG. 2, the control unit 130 deletes entire imaged content from the information recording medium 134 (step S151). When the entire imaged content has been deleted from the information recording medium 134, the control unit 130 determines whether automatic deletion of position information is enabled (step S152).

When it is determined at step S152 that automatic deletion of position information is enabled, the control unit 130 deletes entire information of the position of the information processing apparatus 100 acquired until then from the information recording medium 134 (step S153). The process of deleting entire imaged content is then terminated.

When it is determined at step S152 that automatic deletion of position information is disabled, the process of deleting entire imaged content is terminated without deleting information of the position of the information processing apparatus 100.

As thus described, when entire imaged content is deleted from the information recording medium 134, entire information on the position of the information processing apparatus 100 acquired until then is deleted from the information recording medium 134. Thus, wasteful use of the capacity of the information recording medium 134 can be avoided to use the information recording medium 134 effectively.

The process of deleting entire imaged content according to the first embodiment of the invention has been described above. The process of initializing (formatting) the information recording medium 134 according to the first embodiment of the invention will now be described.

Figure 7:
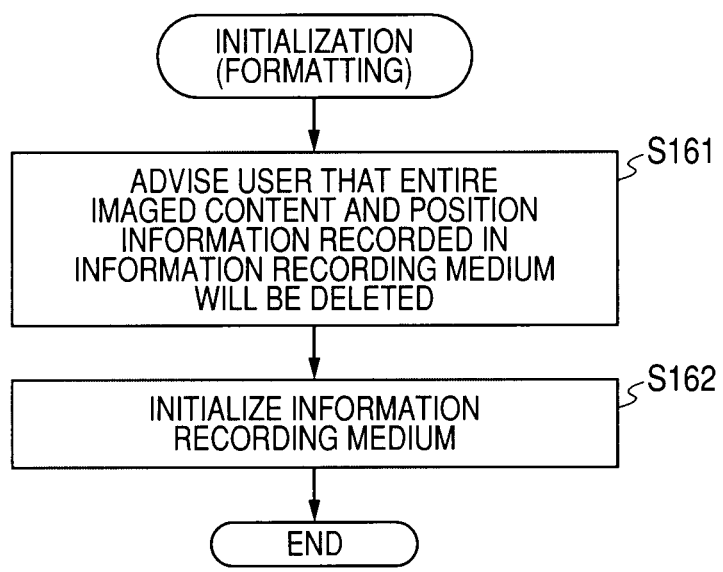
FIG. 7 is a flow chart for explaining a process of initializing (formatting) the information recording medium according to the first embodiment of the invention.

FIG. 7 is a flow chart for explaining the process of initializing (formatting) the information recording medium 134 according to the first embodiment of the invention. The process of initializing (formatting) the information recording medium 134 according to the first embodiment of the invention will be described below with reference to FIG. 7.

When the apparatus proceeds to the process of initializing (formatting) the information recording medium 134 at step S122 shown in FIG. 2, the control unit 130 causes the display unit 136 to display a message indicating that imaged content and information on the position of the information processing apparatus 100 recorded in the information recording medium 134 will be entirely deleted (step S161). When the user accepts the initialization (formatting) of the information recording medium 134, the control unit 130 initializes (formats) the information recording medium 134 (step S162).

As thus described, when the information recording medium 134 is initialized, not only imaged content but also information on the position of the information processing apparatus 100 is erased. Thus, wasteful use of the capacity of the information recording medium 134 can be avoided to use the information recording medium 134 effectively.

The process of initializing (formatting) the information recording medium 134 according to the first embodiment of the invention has been described above.

As described above, according to the first embodiment of the invention, when a piece of imaged content is deleted from an information recording medium in which imaged content and position information are recorded independently of each other, position information temporally associated with the piece of imaged content is deleted from the information recording medium. Thus, wasteful use of the capacity of the information recording medium can be avoided to use the information recording medium effectively.

Second Embodiment

The first embodiment of the invention has been described as a case in which an imaging unit and a microphone for acquiring imaged content, a GPS reception unit, an acceleration sensor, a gyro sensor, and a terrestrial magnetism sensor for generating position information are included in the same information processing apparatus.

It is not necessarily essential that imaged content and various types of information used for generating position information are acquired by the same apparatus. For example, the acquisition of imaged content and the acquisition of various types of information used for generating position information may be carried out by separate apparatus. Various type of information used for generating position information may be transmitted to the apparatus which has acquired imaged content, and the imaged content and the position information may be saved in an information recording medium incorporated in the apparatus which has acquired the imaged content. An information processing apparatus and an information processing method used in such a situation will be described as a second embodiment of the invention.

Figure 8:
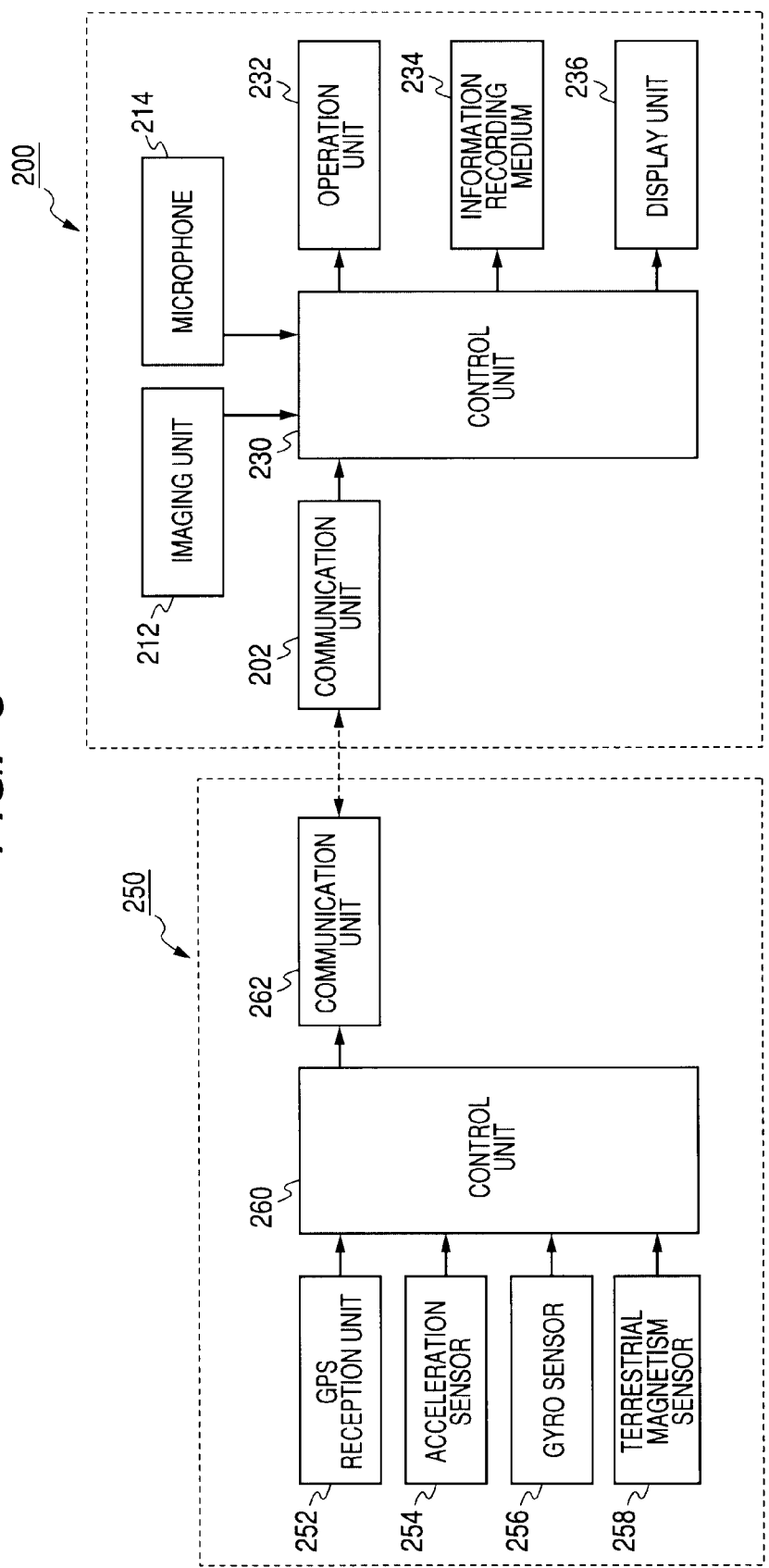
FIG. 8 is an illustration for explaining a configuration of an information processing apparatus and a position information acquisition apparatus according to a second embodiment of the invention.

FIG. 8 is an illustration for explaining a configuration of an information processing apparatus 200 and a position information acquisition apparatus 250 according to the second embodiment of the invention. The configuration of the information processing apparatus 200 and the position information acquisition apparatus 250 according to the second embodiment of the invention will be described below with reference to FIG. 8.

The information processing apparatus 200 acquires imaged content by imaging an object. The position information acquisition apparatus 250 acquires various types of information to be used for generating position information and transmits the information to the information processing apparatus 200. In order to accurately locate an imaged position at which imaged content is acquired, it is desirable that the information processing apparatus 200 and the position information acquisition apparatus 250 are used at a relatively short distance (several tens centimeters to several meters) from each other.

As shown in FIG. 8, the information processing apparatus 200 according to the second embodiment of the invention includes a communication unit 202, an imaging unit 210, a microphone 212, a control unit 230, an operation unit 232, an information recording medium 234, and a display unit 236. The position information acquisition apparatus 250 includes a GPS reception unit 252, an acceleration sensor 254, a gyro sensor 256, a terrestrial magnetism sensor 258, a control unit 260, and a communication unit 262.

Each part of the information processing apparatus 200 will be first described. The communication unit 202 communicates with the communication unit 262 of the position information acquisition apparatus 250. In the present embodiment, the communication unit receives various types of information to be used for generating position information acquired by the position information acquisition apparatus 250 and sends the information to the control unit 230.

The control unit 230 receives information from each part of the information processing apparatus 200 and performs calculation processes using the information thus received. Although not shown, the control unit 230 may include a CPU and a memory for temporarily storing data to be used for the calculation processes. The control unit 230 generates image data and audio data (imaged content) using electrical signals from the imaging unit 210 and the microphone 212. The control unit 230 also generates information on the position of the position information acquisition apparatus 250 using the various types of information to be used for generating position information received by the communication unit 202.

The imaging unit 210, the microphone 212, the operation unit 232, the information recording medium 234, and the display unit 236 will not be described in detail because they have functions similar to those of the imaging unit 110, the microphone 112, the operation unit 132, the information recording medium 134, and the display unit 136 of the information processing apparatus 100 according to the first embodiment of the invention.

Each part of the position information acquisition apparatus 250 will now be described. The control unit 260 controls each part of the position information acquisition apparatus 250. In the present embodiment, the control unit receives various types of information to be used for generating position information acquired by the GPS reception unit 252, the acceleration sensor 254, the gyro sensor 256, and the terrestrial magnetism sensor 258, respectively, and passes the information to the communication unit 262. Although not shown, the control unit 260 may include a CPU and a memory for temporarily storing data to be used for calculation processes.

The communication unit 262 receives the various types of information to be used for generating position information from the control unit 260 and transmits the information out of the apparatus. The various types of information to be used for generating position information may be transmitted on either wired or wireless basis.

The GPS reception unit 252, the acceleration sensor 254, the gyro sensor 256, and the terrestrial magnetism sensor 258 will not be described in detail because they have functions similar to those of the GPS reception unit 122, the acceleration sensor 124, the gyro sensor 126, and the terrestrial magnetism sensor 128 of the information processing apparatus 100 according to the first embodiment of the invention.

A configuration of the information processing apparatus 200 and the position information acquisition apparatus 250 according to the second embodiment of the invention has been described above. Also in such a configuration of the information processing apparatus 200 and the position information acquisition apparatus 250, when a piece of imaged content recorded in the information recording medium 234 is deleted, position information temporally associated with the deleted imaged content is deleted from the information recording medium 234. Thus, wasteful use of the information recording medium 234 can be avoided to use the information recording medium 234 effectively.

In the second embodiment of the invention, the position information acquisition apparatus 250 only acquires various types of information to be used for generating position information, and information on the position of the position information acquisition apparatus 250 is generated by the information processing apparatus 200. However, the invention is not limited to such an example. Alternatively, the information on the position of the position information acquisition apparatus 250 may be generated by the position information acquisition apparatus 250 itself, and the position information thus generated may be transmitted to the information processing apparatus 200 and recorded in the information recording medium 234.

Third Embodiment

The second embodiment of the invention has been described as a case in which imaged content and various types of information for generating position information are acquired by separate apparatus. A third embodiment of the invention will be described as a case in which various types of information for generating position information are acquired by separate apparatus.

Figure 9:
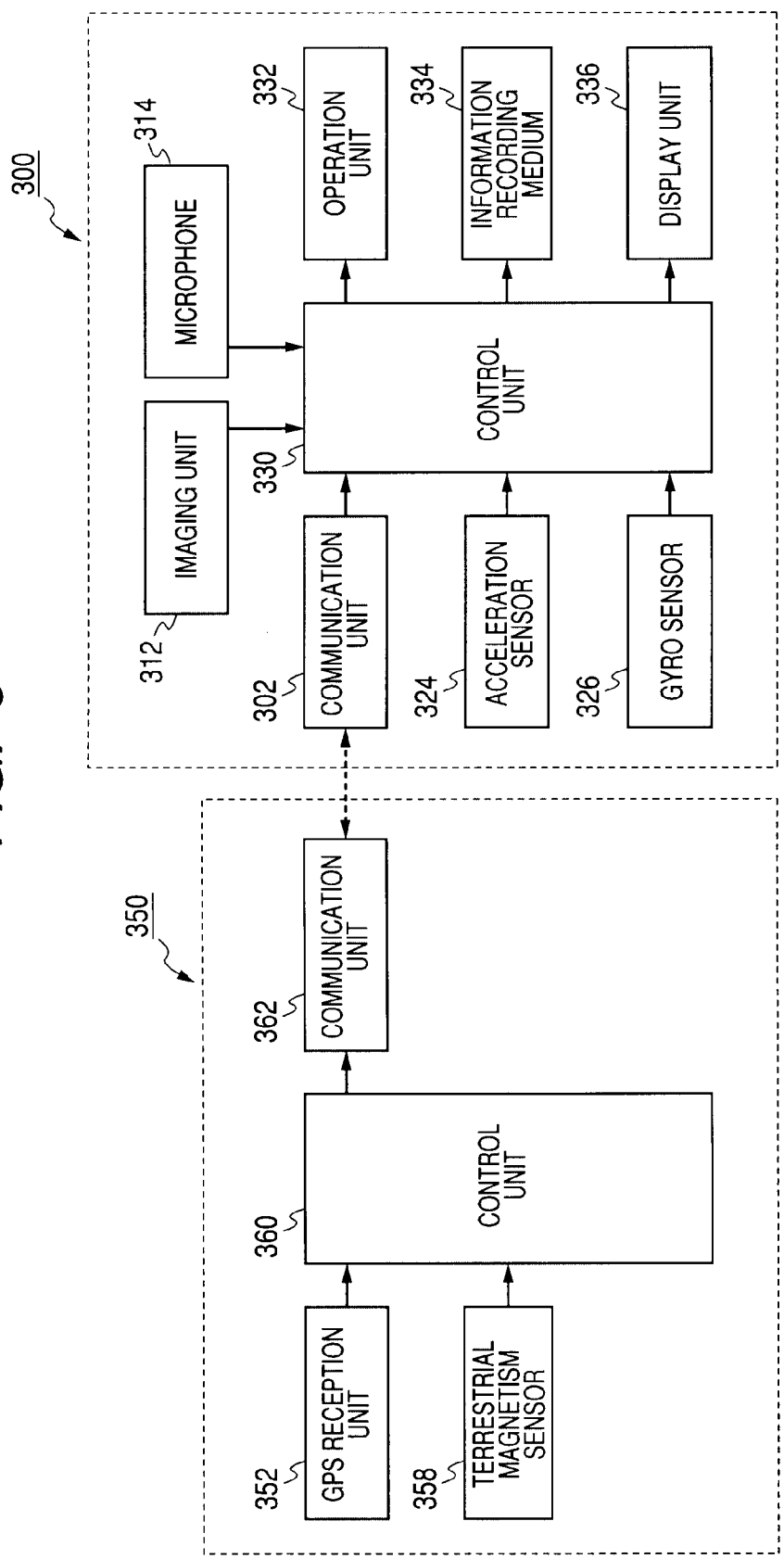
FIG. 9 is an illustration for explaining a configuration of an information processing apparatus and a position information acquisition apparatus according to a second embodiment of the invention.

FIG. 9 is an illustration for explaining a configuration of an information processing apparatus 300 and a position information acquisition apparatus 350 according to the third embodiment of the invention. The configuration of the information processing apparatus 300 and the position information acquisition apparatus 350 according to the third embodiment of the invention will be described below with reference to FIG. 9.

The information processing apparatus 300 acquires imaged content by imaging an object and also acquires some of various types of information to be used for generating position information. The position information acquisition apparatus 350 acquires various types of information to be used for generating position information and transmits the information to the information processing apparatus 300. In order to accurately locate an imaged position at which imaged content is acquired, it is desirable that the information processing apparatus 300 and the position information acquisition apparatus 350 are used at a relatively short distance (several tens centimeters to several meters) from each other just as in the second embodiment of the invention.

As shown in FIG. 9, the information processing apparatus 300 according to the third embodiment of the invention includes a communication unit 302, an imaging unit 310, a microphone 312, an acceleration sensor 324, a gyro sensor 326, a control unit 330, an operation unit 332, an information recording medium 334, and a display unit 336. The position information acquisition apparatus 350 includes a GPS reception unit 352, a terrestrial magnetism sensor 358, a control unit 360, and a communication unit 362.

Each part of the information processing apparatus 300 will be first described. The communication unit 302 communicates with the communication unit 362 of the position information acquisition apparatus 350. In the present embodiment, the communication unit receives some of various types of information to be used for generating position information which are acquired by the position information acquisition apparatus 350, i.e., information on the current position of the information processing apparatus 300 calculated based on a GPS signal received by the GPS reception unit 352 and information on the orientation of the information processing apparatus 300 calculated based on terrestrial magnetism detected by the terrestrial magnetism sensor 358. Those pieces of information are sent to the control unit 330.

The control unit 330 receives information from each part of the information processing apparatus 300 and performs calculation processes using the information thus received. Although not shown, the control unit 330 may include a CPU and a memory for temporarily storing data to be used for the calculation processes. The control unit 330 generates image data and audio data (imaged content) using electrical signals from the imaging unit 310 and the microphone 312. The control unit 330 also generates position information using the information received by the communication unit 302, acceleration information detected by the acceleration sensor 324, angular velocity information detected by the gyro sensor 326.

The imaging unit 310, the microphone 312, the acceleration sensor 324 the gyro sensor 326, the operation unit 332, the information recording medium 334, and the display unit 336 will not be described in detail because they have functions similar to those of the imaging unit 110, the microphone 112, the acceleration sensor 124, the gyro sensor 126, the operation unit 132, the information recording medium 134, and the display unit 136 of the information processing apparatus 100 according to the first embodiment of the invention.

Each part of the position information acquisition apparatus 350 will now be described. The control unit 360 controls each part of the position information acquisition apparatus 350. In the present embodiment, the control unit receives various types of information to be used for generating position information acquired by the GPS reception unit 352 and the terrestrial magnetism sensor 358, respectively, and passes the information to the communication unit 362. Although not shown, the control unit 360 may include a CPU and a memory for temporarily storing data to be used for calculation processes.

The communication unit 362 receives the various types of information to be used for generating position information from the control unit 360 and transmits the information out of the apparatus. The various types of information to be used for generating position information may be transmitted on either wired or wireless basis.

The GPS reception unit 352 and the terrestrial magnetism sensor 358 will not be described in detail because they have functions similar to those of the GPS reception unit 122 and the terrestrial magnetism sensor 128 of the information processing apparatus 100 according to the first embodiment of the invention.

A configuration of the information processing apparatus 300 and the position information acquisition apparatus 350 according to the third embodiment of the invention has been described above. Also in such a configuration of the information processing apparatus 300 and the position information acquisition apparatus 350, when a piece of imaged content recorded in the information recording medium 334 is deleted, position information temporally associated with the deleted imaged content is deleted from the information recording medium 334. Thus, wasteful use of the information recording medium 334 can be avoided to use the information recording medium 334 effectively.

The above-described information processing methods may be implemented as follows. In the recording medium provided in each of the information processing apparatus 100, 200, and 300, a computer program created to execute the method of processing content data according to one embodiment of the invention may be stored in advance. The computer program may be sequentially read and executed by an arithmetic unit such as a CPU (central processing unit).

While the embodiments of the invention have been described above with reference to the accompanying drawings, it is obvious that the invention is not limited to such embodiment. It should be understood by those skilled in the art that various modifications, combinations and alterations may occur depending on design requirements and other factors insofar as they are within the scope of the appended claims or the equivalents thereof.

At the process of selectively deleting imaged content in the above-described embodiment, it is determined whether imaged content obtained on a certain day has been entirely deleted, and position information having the same date is deleted from the information recording medium when the content has been entirely deleted. The invention is not limited to such an embodiment. For example, when the deleted imaged content is a moving image, part of position information generated during the operation of imaging the moving image may be deleted.

Specifically, let us assume for example that a moving image is imaged from 2:50 p.m. on Aug. 1, 2007 until 3:15 p.m. on Aug. 1, 2007; position information is generated from 2:40 p.m. on Aug. 1, 2007 until 3:30 p.m. on Aug. 1, 2007 at intervals of 2 minutes each; and the image and the position information are recorded in a recording medium. Then, when the imaged moving image is deleted from the recording medium, pieces of position information generated during the period from p.m. on Aug. 1, 2007 until 3:14 p.m. (or 3:16 p.m.) on Aug. 1, 2007 may be deleted from the recording medium.

The invention may be applied to information processing apparatus, information processing methods, and computer programs. In particular, the invention may be applied to an information processing apparatus in which content and position information are recorded independently of each other and an information processing method and a computer program to be used for content and position information recorded independently of each other.

What is claimed is:
1. An electronic device comprising:
circuitry configured to receive an instruction to delete a piece of content from a recording medium in which the content and position information are stored in separate and independent files;

control deletion of a piece of the content from the recording medium based on the received instruction;

identify position information temporally associated with the deleted piece of the content; and delete the identified position information from the recording medium, wherein when content generated during a specified time period is deleted from the recording medium, the circuitry is configured to delete all position information generated during the specified time period from the recording medium.

2. The electronic device according to claim 1, wherein when content generated on a specified day is entirely deleted, the circuitry is configured to delete all position information generated on the day from the recording medium.

3. The electronic device according to claim 1, wherein the circuitry is configured to delete the position information entirely from the recording medium when the entire content is deleted.

4. The electronic device according to claim 1, wherein the circuitry is configured to generate the position information.

5. The electronic device according to claim 1, further comprising:

an imaging unit configured to generate the content by imaging an object.

6. An information processing method, comprising:

receiving an instruction to delete a piece of content from a recording medium in which the content and position information are stored in separate and independent files;

deleting the piece of content from the recording medium based on the received instruction;

identifying position information temporally associated with the deleted piece of content; and deleting the identified position information from the recording medium, wherein when content generated during a specified time period is deleted from the recording medium, the deleting includes deleting all position information generated during the specified time period from the recording medium.

7. A non-transitory computer-readable medium including computer-program instructions, which when executed by an electronic device, cause the electronic device to:

receive an instruction to delete a piece of content from a recording medium in which the content and position information are stored in separate and independent files;

delete the piece of content from the recording medium based on the received instruction;

identify position information temporally associated with the deleted piece of content; and delete the identified position information from the recording medium, wherein when content generated during a specified time period is deleted from the recording medium, the deleting includes deleting all position information generated during the specified time period from the recording medium.

8. The electronic device according to claim 1, wherein the content selected for deletion based on the received instruction corresponds to a moving image.

9. The electronic device according to claim 8, wherein the circuitry is configured to identify and delete position information generated at a timing corresponding to an operation of capturing the moving image.

10. The electronic device according to claim 1, wherein the content and the position information are each recorded in separate and independent folders.

11. The electronic device according to claim 1, wherein the circuitry is configured to determine whether or not the electronic device is set to automatic deletion based on a received user input.

12. The electronic device according to claim 1, wherein the position information indicates at least one of a route or path information.

13. The electronic device according to claim 1, wherein the position information corresponds to a geographic position of the electronic device.

* * * * *